United States Patent
Nakazawa et al.

(10) Patent No.: US 12,188,795 B2
(45) Date of Patent: Jan. 7, 2025

(54) REFLECTION-TYPE OPTICAL ENCODER SCALE INCLUDING A HIGH REFLECTION REGION AND A LOW REFLECTION REGION HAVING A LOW REFLECTION PORTION INCLUDING A METALLIC CHROMIUM FILM, A CHROMIUM OXIDE FILM, AND A CHROMIUM NITRIDE FILM, AND REFLECTION-TYPE OPTICAL ENCODER INCLUDING SAME

(71) Applicant: Dai Nippon Printing Co., Ltd., Tokyo (JP)

(72) Inventors: Shinsuke Nakazawa, Tokyo (JP); Takeshi Toda, Tokyo (JP); Naoya Oda, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 3 days.

(21) Appl. No.: 17/906,272

(22) PCT Filed: Mar. 30, 2021

(86) PCT No.: PCT/JP2021/013676
§ 371 (c)(1),
(2) Date: Sep. 14, 2022

(87) PCT Pub. No.: WO2021/201024
PCT Pub. Date: Oct. 7, 2021

(65) Prior Publication Data
US 2023/0126475 A1    Apr. 27, 2023

(30) Foreign Application Priority Data
Mar. 31, 2020  (JP) .................................. 2020-063476

(51) Int. Cl.
*G01D 5/347*  (2006.01)
*G02B 5/08*  (2006.01)

(52) U.S. Cl.
CPC ....... *G01D 5/34707* (2013.01); *G01D 5/3473* (2013.01); *G01D 5/34746* (2013.01); *G02B 5/085* (2013.01)

(58) Field of Classification Search
CPC ............. G01D 5/34707; G01D 5/3473; G01D 5/34746; G02B 5/085; G01B 11/02
See application file for complete search history.

(56) References Cited

U.S. PATENT DOCUMENTS

2015/0160041 A1 *  6/2015  Hikichi .................... G01D 5/12
                                                                216/22

FOREIGN PATENT DOCUMENTS

DE    102004012271 A1 *  11/2004  .......... B23K 26/364
JP    S61197510 U    *  12/1986
(Continued)

OTHER PUBLICATIONS

International Search Report and Written Opinion (Application No. PCT/JP2021/013676) dated Jun. 22, 2021 (with English translation).

*Primary Examiner* — Jennifer D Bennett
(74) *Attorney, Agent, or Firm* — BURR PATENT LAW, PLLC

(57) ABSTRACT

A main object of the present disclosure is to provide a reflection-type optical encoder scale capable of sufficiently reducing the reflectance on a low reflection region. The present disclosure achieves the object by providing a reflection-type optical encoder scale comprising a high reflection region and a low reflection region alternately placed on a substrate, wherein the low reflection region includes a low reflection portion including a metallic chromium film formed on the substrate, and a chromium oxide film and a (Continued)

chromium nitride film randomly formed on the metallic chromium film; and the high reflection region has higher reflectance of incident light from opposite side to the substrate of the reflection-type optical encoder scale, than the low reflection region.

8 Claims, 14 Drawing Sheets

(56) References Cited

FOREIGN PATENT DOCUMENTS

| | | |
|---|---|---|
| JP | H07-305163 A | 11/1995 |
| JP | 2005-241248 A | 9/2005 |
| JP | 2019-158710 A | 9/2019 |

\* cited by examiner

| Thickness of chromium nitride/nm \ Thickness of chromium oxide/nm | 0 | 10 | 20 | 30 | 40 | 50 | 60 | 70 | 80 |
|---|---|---|---|---|---|---|---|---|---|
| 10 | - | - | - | - | - | - | △ | ○ | ○ |
| 20 | - | - | - | △ | ○ | ◎ | ◎ | ◎ | ◎ |
| 30 | - | △ | ○ | ◎ | ◎ | ◎ | ◎ | ◎ | ○ |
| 40 | ○ | ○ | ◎ | ◎ | ◎ | ◎ | ◎ | ○ | ○ |
| 50 | ○ | ○ | ○ | ○ | ○ | ○ | △ | △ | △ |
| 60 | △ | △ | △ | △ | △ | △ | △ | △ | △ |
| 70 | - | - | - | - | - | - | - | - | - |
| 80 | - | - | - | - | - | - | - | - | - |

| Thickness of chromium nitride/nm | Thickness of chromium oxide/nm | | | | | | | | |
|---|---|---|---|---|---|---|---|---|---|
| | 0 | 10 | 20 | 30 | 40 | 50 | 60 | 70 | 80 |
| 10 | - | - | - | - | - | - | - | - | - |
| 20 | - | - | - | - | △ | △ | △ | △ | |
| 30 | △ | △ | △ | △ | ○ | ○ | ○ | △ | |
| 40 | ○ | ○ | ○ | ◎ | ○ | ○ | ○ | ○ | |
| 50 | ◎ | ◎ | ◎ | ◎ | ○ | ○ | ○ | ○ | |
| 60 | ○ | ○ | ○ | ○ | ○ | ○ | ○ | ○ | |
| 70 | △ | △ | △ | △ | △ | △ | △ | △ | |
| 80 | △ | △ | △ | △ | △ | △ | △ | △ | |

| | Thickness of chromium oxide/nm | | | | | | | | |
|---|---|---|---|---|---|---|---|---|---|
| Thickness of chromium nitride/nm | 0 | 10 | 20 | 30 | 40 | 50 | 60 | 70 | 80 |
| 10 | - | - | △ | ○ | ○ | △ | - | - | - |
| 20 | - | - | ○ | ◎ | △ | - | - | - | - |
| 30 | - | ○ | ◎ | ○ | - | - | - | - | - |
| 40 | - | ◎ | ◎ | △ | - | - | - | - | - |
| 50 | △ | ◎ | △ | - | - | - | - | - | - |
| 60 | ○ | ○ | - | - | - | - | - | - | - |
| 70 | ◎ | △ | - | - | - | - | - | - | - |
| 80 | ○ | - | - | - | - | - | - | - | - |

| | Thickness of chromium oxide/nm | | | | | | | | |
|---|---|---|---|---|---|---|---|---|---|
| Thickness of chromium nitride/nm | 0 | 10 | 20 | 30 | 40 | 50 | 60 | 70 | 80 |
| 10 | - | - | △ | ○ | ○ | ○ | △ | - | |
| 20 | - | △ | ○ | ◎ | ○ | △ | - | - | |
| 30 | - | △ | ○ | ○ | △ | - | - | - | |
| 40 | - | ○ | ○ | △ | - | - | - | - | |
| 50 | - | ○ | △ | - | - | - | - | - | |
| 60 | △ | △ | △ | - | - | - | - | - | |
| 70 | △ | △ | - | - | - | - | - | - | |
| 80 | △ | - | - | - | - | - | - | - | |

REFLECTION-TYPE OPTICAL ENCODER SCALE INCLUDING A HIGH REFLECTION REGION AND A LOW REFLECTION REGION HAVING A LOW REFLECTION PORTION INCLUDING A METALLIC CHROMIUM FILM, A CHROMIUM OXIDE FILM, AND A CHROMIUM NITRIDE FILM, AND REFLECTION-TYPE OPTICAL ENCODER INCLUDING SAME

TECHNICAL FIELD

The present disclosure relates to a reflection-type optical encoder scale and an encoder.

BACKGROUND ART

Conventionally, in the field of measuring devices, for example, an optical encoder capable of measuring the dimensions, for example, with high accuracy is used. As the optical encoder, there is a transmission-type encoder and a reflection-type encoder, and the reflection-type encoder has advantages that the optical path is shorter as compared with the transmission-type encoder, so that it is easy to make the size and thickness thereof smaller. Further, assembly thereof is easy since alignment of the light emitting element and the light receiving element is not necessary.

The reflection-type optical encoder includes a reflection-type optical scale, a light source such as an LED that irradiates light to the scale, and a light detector that detects reflected light from the scale. The reflection-type optical scale comprises a reflection region (high reflection region) and a non-reflection region (low reflection region) alternately placed, and the reflection region has higher light reflectance than that of the non-reflection region. Thus, the intensity of light reflected from the scale and incident on the light detector differs according to the positional variation of the scale. The light detector detects the light intensity difference caused by the positional movement of the scale in the length measuring direction. The reflection-type optical encoder may process this displacement information of the position of the scale and acquire positional information based on the intensity difference of the detected light.

In order to prevent false detection by the light detector in the reflection region and non-reflection region formed on the reflection-type optical scale, and to increase the detection accuracy of the signal, reflectance of the reflection region should be high and reflectance of the non-reflection region should be low.

For example, Patent Document 1 discloses a reflection-type optical scale wherein the difference between the reflected light intensity in the high reflection region and the reflected light intensity of the low reflection region is increased by employing a multilayered structure including metallic Ti, $SiO_2$, $TiO_2$, and $SiO_2$ stacked in this order, so as to make the reflectance on the non-reflection region of a reflection-type optical encoder low. However, $SiO_2$ film used is expensive, and two kinds of materials Ti and Si are necessary for the raw material for film formation, which is disadvantageous in terms of cost.

Also, Patent Document 2 discloses a reflection-type optical scale wherein a part of one surface of a substrate having a higher surface reflectance is covered with a non-reflection pattern including a metal oxide film and a metal nitride.

Patent Document 3 describes to use chromium or chromium compounds such as chromium oxide and chromium nitride as materials for forming a pattern formed film having a lower light reflectance than that of a reflection film.

CITATION LIST

Patent Documents

Patent Document 1: Japanese Patent Application Laid-Open (JP-A) No. 2019-158710
Patent Document 2: Japanese Utility Model Application Laid-Open No. S61-197510
Patent Document 3: JP-A No. 2005-241248

SUMMARY

Technical Problem

Although various configurations of the reflection-type optical scale have been proposed as described above, the present inventors have found that the conventional configuration of the low reflection region of the reflection-type optical encoder scale may not sufficiently reduce reflectance in the red/near infrared region. Therefore, further reduction of the reflectance of the low reflection region is desired.

The present disclosure has been made in view of the above circumstances, and a main object of the present disclosure is to provide a reflection-type optical encoder scale capable of sufficiently reducing the reflectance on a low reflection region.

Solution to Problem

The present disclosure provides a reflection-type optical encoder scale comprising a high reflection region and a low reflection region alternately placed on a substrate, wherein the low reflection region includes a low reflection portion including a metallic chromium film placed on one surface of the substrate, and a chromium oxide film and a chromium nitride film randomly placed on a surface of the metallic chromium film, on opposite side to the substrate; and the high reflection region has higher reflectance of incident light from opposite side to the substrate of the reflection-type optical encoder scale, than the low reflection region.

According to the present disclosure, a reflection-type optical encoder scale capable of reducing the reflectance on a low reflection region, may be obtained by the low reflection region including a low reflection portion including a metallic chromium film formed on the substrate, and a chromium oxide film and a chromium nitride film randomly formed on the metallic chromium film.

In the disclosure, an outermost surface of the low reflection region is preferably the chromium oxide film or the chromium nitride film. Also, the low reflection region preferably includes the metallic chromium film; the chromium nitride film placed on a surface of the metallic chromium film, on opposite side to the substrate; and the chromium oxide film placed on a surface of the chromium nitride film, on opposite side to the metallic chromium film. The reason therefor is to further reduce the reflectance on the low reflection region.

In the disclosure, the high reflection region preferably includes the metallic chromium film formed on the substrate. The reason therefor is to simplify the production process so as to reduce costs.

In the disclosure, the high reflection region may include a metallic silver film or a silver alloy film containing silver as a main component, formed on the substrate. With such a metallic silver film or a silver alloy film, the reflectance on the high reflection region may further be increased.

Further in the disclosure, a reflectance on the high reflection region, of any one of wavelengths in a wavelength range of 550 nm to 950 nm, may be 60% or more; and a value of ratio S/N represented by the following formula may be 100 or more.

ratio S/N=reflectance on high reflection region/reflectance on low reflection region Incidentally, the reflectance on the high reflection region and the reflectance on the low reflection region in the above formula denote the reflectance of the same wave length.

The present disclosure provides a reflection-type optical encoder comprising: the reflection-type optical encoder scale described above; a light source configured to irradiate light to a surface of the reflection-type optical encoder scale, on a side wherein the low reflection portion is placed; and a light detector configured to detect light from the light source, reflected by the reflection-type optical encoder scale.

Since the reflection-type optical encoder in the present disclosure includes the reflection-type optical encoder scale described above, the difference between the reflectance on the high reflection region and the reflectance on the low reflection region may be increased so that a false detection by the light detector may be prevented.

The present disclosure provides a reflection-type optical encoder scale comprising a high reflection region and a low reflection region alternately placed on a transparent substrate, wherein the low reflection region includes a light reflection portion including a chromium oxide film and a chromium nitride film randomly placed on one surface of the transparent substrate, and a metallic chromium film placed on a surface of the chromium oxide film or the chromium nitride film, on opposite side to the substrate; and the high reflection region has higher reflectance of incident light from the transparent substrate side of the reflection-type optical encoder scale, than the low reflection region.

According to the present disclosure, a reflection-type optical encoder scale capable of reducing the reflectance on a low reflection region, may be obtained by the low reflection region including a light reflection portion including a chromium oxide film and a chromium nitride film randomly formed on the transparent substrate, and a metallic chromium film formed on the chromium oxide film or the chromium nitride film.

In the disclosure, the low reflection region preferably includes the chromium oxide film placed on one surface of the transparent substrate; the chromium nitride film placed on a surface of the chromium oxide film, on opposite side to the transparent substrate; and the metallic chromium film placed on a surface of the chromium nitride film, on opposite side to the chromium oxide film. The reason therefor is to further reduce the reflectance on the low reflection region.

In the disclosure, the high reflection region preferably includes the metallic chromium film placed on a surface of the transparent substrate, on a side wherein the light reflection portion is placed. The reason therefor is to simplify the production process so as to reduce costs.

In the disclosure, the high reflection region may include a metallic silver film or a silver alloy film containing silver as a main component placed on a surface of the transparent substrate, on a side wherein the light reflection portion is placed. With such a metallic silver film or a silver alloy film, the reflectance on the high reflection region may further be increased.

Further, in the disclosure, a reflectance on the high reflection region, of any one of wavelengths in a wavelength range of 550 nm to 950 nm, is 60% or more; and a value of ratio S/N represented by the following formula is 15 or more.

ratio S/N=reflectance on high reflection region/reflectance on low reflection region Incidentally, the reflectance on the high reflection region and the reflectance on the low reflection region in the above formula denote the reflectance of the same wave length.

The present disclosure provides a reflection-type optical encoder comprising: the reflection-type optical encoder scale described above; a light source configured to irradiate light to a surface of the reflection-type optical encoder scale, on an opposite side to a side wherein the light reflection portion is placed; and a light detector configured to detect light from the light source reflected by the reflection-type optical encoder scale.

Since the reflection-type optical encoder in the present disclosure includes the reflection-type optical encoder scale including the light reflection portion described above, the difference between the reflectance on the high reflection region and the reflectance on the low reflection region may be increased so that a false detection by the light detector may be prevented.

The present disclosure further provides a reflection-type optical encoder scale comprising a high reflection region and a low reflection region alternately placed on a transparent substrate, wherein the low reflection region includes a low reflection portion including at least three stacked inorganic layers, and a reflectance on the low reflection region is 5% or less; the high reflection region includes at least one stacked inorganic layer, and a reflectance on the high reflection region is 60% or more; and a value of ratio S/N represented by the following formula is 6 or more.

ratio S/N=reflectance on high reflection region/reflectance on low reflection region Advantageous Effects The reflection-type optical encoder scale in the present disclosure has an effect that it is capable of sufficiently reducing the reflectance on a low reflection region.

DESCRIPTION OF EMBODIMENTS

Figure 1A:
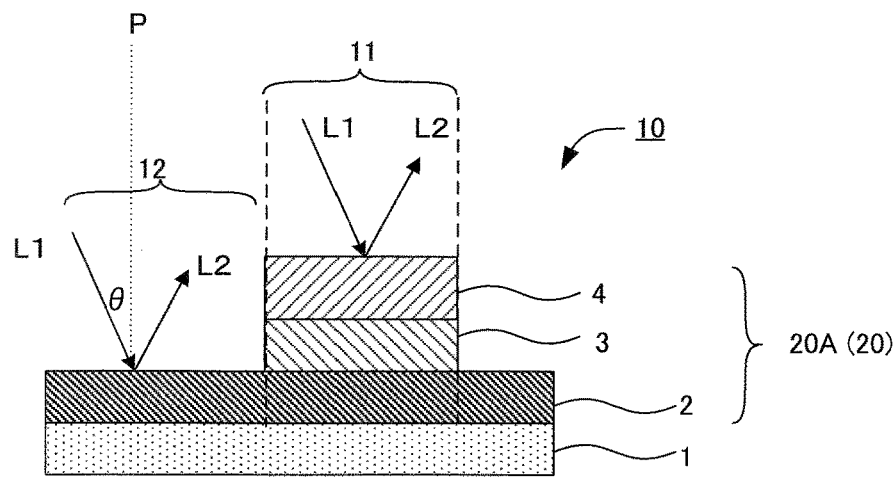
FIGS. 1A and 1B are schematic cross-sectional views illustrating an example of a reflection-type optical encoder scale (first embodiment) in the present disclosure.

The present disclosure includes a reflection-type optical encoder scale and a reflection-type optical encoder in the embodiments. Embodiments in the present disclosure are hereinafter explained with reference to, for example, drawings. However, the present disclosure is enforceable in a variety of different forms, and thus should not be taken as is limited to the contents described in the embodiments exemplified as below. Also, the drawings may show the features of the present disclosure such as width, thickness, and shape of each part schematically comparing to the actual form in order to explain the present disclosure more clearly in some cases; however, it is merely an example, and thus does not limit the interpretation of the present disclosure. Also, in the present description and each drawing, for the factor same as that described in the figure already explained, the same reference sign is indicated and the detailed explanation thereof may be omitted. Further, the present disclosure may be explained using expressions such as upper and lower for convenience purposes, and the upper and lower direction may be reversed.

In the present descriptions, when expressing some structure such as some member and some region, is "on (or below)" the other structure such as other member and other region, unless otherwise stated, not only a case wherein some structure is directly on (or directly below) the other structure, but also a case wherein some structure is on the upper (or the lower) of the other structure is included. That is, it includes a case wherein some structure is the upper (or the lower) of some structure via yet another structure.

Also, in the present descriptions, "reflection-type optical encoder scale" may be referred to as merely "optical scale". Further, light incident on an optical scale denotes light with wavelength λ from a light source incident on the optical scale with incident angle θ.

As the results of the intensive studies on the problems described above, the present inventors have found that, with the conventional configuration of low reflection region (non-reflection region) of the reflection-type optical encoder scale, the reflectance in the red/near infrared region is not sufficiently reduced. Further, as the results of studies on the configuration of the non-reflection region capable of sufficiently decreasing the reflectance, the present inventors have found out that the reflectance of the light incident on a low reflection portion, from opposite side to the metallic chromium film, may be sufficiently reduced with a configuration of a low reflection portion including a metallic chromium film, and a chromium oxide film and a chromium nitride film randomly formed on the metallic chromium film; thereby achieving the present invention.

Examples of the reflection-type optical encoder scale and the encoder in the present disclosure may include a first embodiment wherein light incident on the optical scale from opposite side to the substrate, and a second embodiment wherein light incident from the substrate side, to be described later.

A. Reflection-Type Optical Encoder Scale (First Embodiment)

The reflection-type optical encoder scale in the present embodiment comprises a high reflection region and a low reflection region alternately placed on a substrate, wherein the low reflection region includes a low reflection portion including a metallic chromium film formed on the substrate, and a chromium oxide film and a chromium nitride film randomly formed on the metallic chromium film; and the high reflection region has higher reflectance of incident light from opposite side to the substrate of the reflection-type optical encoder scale, than the low reflection region.

Since such optical scale in the present embodiment includes, as the low reflection region, a low reflection portion including a three-layered structure of a metallic chromium film, and a chromium oxide film and a chromium nitride film randomly formed on the metallic chromium film, from the substrate side, incident light from a light source located at opposite side to the substrate of the optical scale is reflected by the low reflection portion. Thus, of any one of wavelengths in a wavelength range of 550 nm to 950 nm, the reflectance on the low reflection region may be reduced to 10% or less, preferably 5% or less, and further preferably 1% or less. Therefore, the difference between the reflectance on the high reflection region and the reflectance on the low reflection region may be increased.

In the present descriptions, the reflectance may be obtained by measuring thereof using Scanning Spectrophotometer UV-3100PC (from Shimadzu Corporation) as a measuring device.

Meanwhile, the reflectance of the low reflection region cannot be sufficiently reduced with the low reflection portion including a two-layered structure of a metallic chromium film and a chromium oxide film; a two-layered structure of a metallic chromium film and a chromium nitride film; or a combination of other metallic film and a chromium oxide film and/or a chromium nitride film.

Also, the chromium oxide film and the chromium nitride film may be easily formed by utilizing a reactive sputtering method, for example, by only preparing the metallic chromium. Further, compared to a silicon oxide film, a high precision patterning may be easily carried out.

In the present specification, "a chromium oxide film and a chromium nitride film randomly formed on the metallic chromium film" means that they may be formed in the order of the metallic chromium film, the chromium oxide film and the chromium nitride film, and may be formed in the order of the metallic chromium film, the chromium nitride film and the chromium oxide film.

Figure 1B:
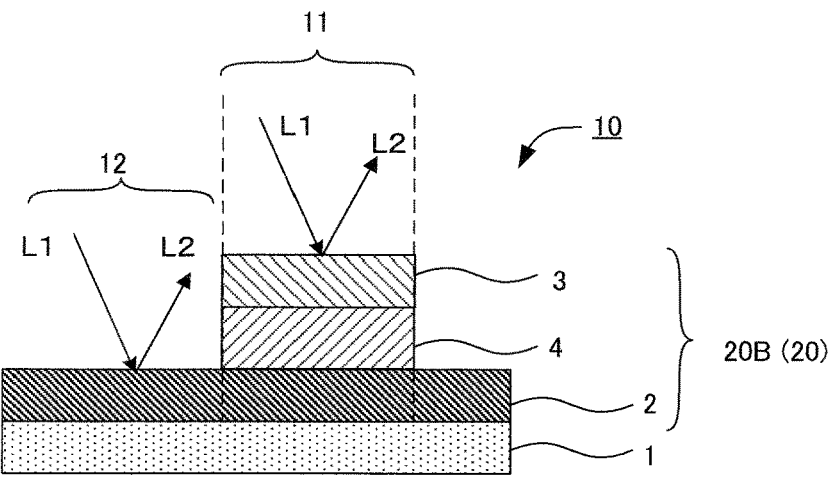

FIGS. 1A and 1B are schematic cross-sectional views illustrating an example of a reflection-type optical encoder scale in the present embodiment. Optical scale 10 in the present embodiment shown in FIGS. 1A and 1B comprises high reflection region 12 and low reflection region 11 alternately placed on substrate 1. The high reflection region 12 includes metallic chromium film 2 formed on the substrate 1, and reflects light L1 by the metallic chromium film 2. In FIG. 1A, the low reflection region 11 includes low reflection portion 20A in the first aspect including the metallic chromium film 2 formed on the substrate 1, a chromium nitride film 3 formed on the metallic chromium film 2, and chromium oxide film 4 formed on the chromium nitride film 3, and reflects light L1 by the low reflection portion 20A. Meanwhile, in FIG. 1B, the low reflection region 11 includes low reflection portion 20B in the second aspect including the metallic chromium film 2 formed on the substrate 1, a chromium oxide film 4 formed on the metallic chromium film 2, and chromium nitride film 3 formed on the chromium oxide film 4, and reflects light L1 by the low reflection portion 20B.

The optical scale shown in FIGS. 1A and 1B is advantageous in view of cost since the number of the layered structure is small. Also, of any one of wavelengths in a wavelength range of 550 nm to 950 nm, the reflectance on the low reflection region may be reduced to 10% or less, preferably 5% or less, and further preferably 1% or less, by adjusting the thickness of the films.

(1) Low Reflection Region

The low reflection region in the present disclosure includes a low reflection portion. The low reflection portion includes a metallic chromium film formed on the substrate; and a chromium oxide film and a chromium nitride film randomly formed on the metallic chromium film. Specifically, the low reflection portion includes the metallic chromium film, the chromium nitride film, and the chromium oxide film placed in this order, or the metallic chromium film, the chromium oxide film, and the chromium nitride film placed in this order; and in the optical scale, they are placed so as the metallic chromium film is on the substrate side. The outermost surface of the low reflection region is preferably the surface of the chromium oxide film or the chromium nitride film of the low reflection portion, and particularly preferably the surface of the chromium oxide film. This is because the reflectance on the low reflection region may be reduced more effectively.

Hereinafter, "a low reflection portion wherein a metallic chromium film, a chromium nitride film, and a chromium oxide film are placed in this order" is referred to as a low reflection portion in the first aspect, "a low reflection portion wherein a metallic chromium film, a chromium oxide film, and a chromium nitride film are placed in this order" is referred to as a low reflection portion in the second aspect.

(i) Low Reflection Portion in First Aspect

In the low reflection portion in the present aspect, the metallic chromium film, the chromium nitride film, and the chromium oxide film are placed in this order from the substrate side. The low reflection region including the low reflection portion in the present aspect is capable of reducing the reflectance, of any one of wavelengths in a wavelength range of 550 nm to 950 nm, of light irradiated from the light source, to 5% or less, and particularly 0.5% or less, as well as the reflectance variation with respect to the wavelength variation is gentle, and it is easy to control the reflectance. Hereinafter, each layer will be described in detail.

(a) Metallic Chromium Film

In the present aspect, the metallic chromium film is provided on a substrate. The metallic chromium film is a layer including metallic chromium. The metallic chromium film is a layer which does not substantially transmit the light irradiated from the light source, and the transmittance of the layer is preferably 1.0% or less. The transmittance may be measured using a spectrophotometer MPC-3100 (from Shimadzu Corporation), for example.

The thickness is, for example, 40 nm or more, and preferably 70 nm or more.

Here, the "thickness" of each member means a thickness obtained by a general method for measuring. Examples of the method for measuring the thickness may include a stylus-type method of calculating the thickness by detecting the trace uneven of the surface with a stylus; and an optical-type method of calculating the thickness based on a spectral reflection spectrum. Specifically, the thickness may be measured using a stylus-type film thickness meter P-15 from KLA Corporation. Incidentally, an average value of thickness measurement results at a plurality of locations of the target member may be used as the thickness.

As a method for forming a metallic chromium film, for example, a physical vapor deposition method (PVD) such as a sputtering method, an ion plating method, and a vacuum vapor deposition method is used.

(b) Chromium Nitride Film

The chromium nitride film in the present aspect is placed between the metallic chromium film and the chromium oxide film. Unlike the chromium oxynitride, and chromium oxynitride carbide, for example, the chromium nitride film includes chromium and nitrogen as main components, and does not substantially include impurities other than chromium and nitrogen.

The "x" representing an atomic ratio of Cr and N in the chromium nitride (CrNx) film is preferably 0.4 or more and 1.1 or less.

Also, as the purity of the chromium nitride film, the ratio of chromium and nitrogen, when the whole film is 100 atomic %, is preferably in a range of 80 to 100%, and more preferably in a range of 90 to 100%. As the impurity, for example, hydrogen, oxygen, and carbon may be included.

The thickness ($T_N$) of the chromium nitride film is preferably in a range of 5 nm to 100 nm, particularly preferably in a range of 10 nm to 80 nm. Also, in relation to the thickness ($T_O$) of the chromium oxide film described later, when the wavelength is 850 nm, the total of $T_N$ and $T_O$ is preferably 40 nm or more, and when the wavelength is 550 nm, the total of $T_N$ and $T_O$ is preferably 20 nm or more. When the thickness is in the above range, the reflectance in the low reflection region may be easily reduced to 10% or less, and particularly 5% or less, as compared with a case wherein the thickness is out of the above range. Further, the thickness ($T_N$) of the chromium nitride film is preferably in a range of 10 nm to 80 nm, since it is easy to reduce the reflectance in the entire range of green to infrared (approximately 500 to 1000 nm) range.

As a method for forming a chromium nitride, for example, a physical vapor deposition method (PVD) such as a reactive sputtering method, an ion plating method, and a vacuum vapor deposition method is used. When the reactive sputtering method is used, nitrogen may be introduced into argon (Ar) gas, and a chromium nitride film may be formed by a reactive sputtering method using a Cr target. In this case, the composition of the chromium nitride film may be controlled by controlling the ratio of Ar gas and nitrogen gas.

(c) Chromium Oxide Film

The chromium oxide film is formed on the chromium nitride film, and the main components thereof are chromium and oxygen, and, unlike chromium oxynitride and chromium oxynitride carbide, it does not substantially include impurities other than chromium and oxygen.

As "y" representing the atomic ratio of Cr and O in the chromium oxide (CrOy) film, it is preferably 1.4 or more and 2.1 or less.

Specifically, as the purity of the chromium oxide film, the ratio of chromium and oxygen, when the whole film is 100 atomic %, is preferably in a range of 80 to 100%, and among them, in a range of 90 to 100%. As the impurity, for example, hydrogen, nitrogen, and carbon may be included.

The thickness of the chromium oxide film is not particularly limited, and is preferably in a range of 5 nm to 100 nm, and particularly preferably in a range of 10 nm to 80 nm.

Also, in relation to the thickness ($T_O$) of the chrome oxide film, the total of the thickness of the chrome oxide film ($T_O$) and the chromium nitride film ($T_N$) is preferably in the ranges described in "(i) Low reflection portion in first aspect, (b) Chromium nitride film" above. Further, the thickness ($T_O$) of the chromium oxide film is preferably in a range of 10 nm to 65 nm, since it is easy to reduce the reflectance in the entire range of green to infrared (approximately 500 to 1000 nm) range.

As a method for forming the chromium oxide, for example, a physical vapor deposition (PVD) method such as a reactive sputtering method, an ion plating method, and a vacuum vapor deposition method is used. When the reactive sputtering method is used, oxygen is introduced into argon (Ar) gas, and a chromium oxide film may be formed by a reactive sputtering method using a Cr target. At this time, the composition of the chromium oxide film may be controlled by controlling the ratio of Ar gas and oxygen gas.

(ii) Low Reflection Portion in Second Aspect

In the low reflection portion in the present aspect, the metallic chromium film, the chromium oxide film, and the chromium nitride film are placed in this order from the substrate side. The low reflection region including the low reflection portion in the present aspect is capable of reducing reflectance, of any one of wavelengths in a wavelength range of 550 nm to 950 nm, of light irradiated from the light source to 5% or less, and particularly 1% or less.

Hereinafter, each layer will be described in detail.

(a) Metallic Chromium Film

The metallic chromium film in the present aspect is provided on a substrate. Since the details of the metallic chromium film is the same as "(ii) Low reflection portion in first aspect, (a) Metallic chromium film" described above, the explanation thereof is omitted here.

(b) Chromium Oxide Film

The chromium oxide film in the present aspect is placed between the metallic chromium film and the chromium nitride film. The thickness is not particularly limited, and is preferably in a range of, for example, 5 nm to 60 nm, particularly in a range of 10 nm to 50 nm.

Further, it is preferable to satisfy the relationship with the thickness of the chromium nitride film, which will be described later. The reason therefor is to be able to reduce the reflectance, of any one of wavelengths in a wavelength range of 550 nm to 950 nm, on the low reflection region to 10% or less, and particularly 5% or less, more certainly.

Further, the thickness ($T_O$) of the chromium oxide film is preferably in a range of 5 nm to 35 nm, since it is easy to reduce the reflectance in the entire range of green to infrared (approximately 500 to 1000 nm) range.

Further details of the physical properties, composition and a method for forming a chromium oxide film are the same as those of "(ii) Low reflection portion in first aspect, (c) Chromium oxide film" described above, and therefore, the description thereof is omitted here.

(c) Chromium Nitride Film

The chromium nitride film in the present aspect is formed on the chromium oxide film. The thickness of the chromium nitride film in the present aspect is not particularly limited, and, for example, is preferably in a range of 5 nm to 100 nm, particularly in a range of 10 nm to 80 nm. Further, in relation with the thickness ($T_O$) of the chromium oxide film, when the wavelength is 850 nm, the total of $T_N$ and $T_O$ is preferably 30 nm or more, and when the wavelength is 550 nm, the total of $T_N$ and $T_O$ is preferably 15 nm or more. Further, the thickness ($T_N$) of the chromium nitride film in the present aspect is preferably in a range of 10 nm to 60 nm, since it is easy to reduce the reflectance in the entire range of green to infrared (approximately 500 to 1000 nm) range.

(2) Substrate

In the present disclosure, for example, glass, metal, resin, and silicon may be used as the material for the substrate, and among them, a glass substrate using glass is preferable. This is because the linear expansion coefficient of the glass is small, so that the dimensional variation due to temperature variation in the use environment may be suppressed. The shape of the substrate is not limited, and for example, those used for a rotary encoder may be substantially circular shape in plan view, and those used for a linear encoder may be substantially rectangular shape in plan view.

(3) High Reflection Region

The configuration of the high reflection region in the present embodiment is not particularly limited as long as the reflectance of incident light from opposite side to the substrate of the reflection-type optical encoder scale is higher than the low reflection region. The reflectance on the high reflection region, of any one of wavelengths in a wavelength range of 550 nm to 950 nm, is preferably 60% or more, more preferably 80% or more, and particularly 90% or more. For example, the high reflection region 12 in FIGS. 1A and 1B includes the metallic chromium film 2 placed on the substrate 1, and reflects light by the metallic chromium film.

(4) Method for Producing

A method for producing an optical scale in the present embodiment is not particularly limited, and may be produced by a selective etching or a lift-off. Specifically, the optical scale illustrated in FIGS. 1A and 1B may be produced by the following method. Firstly, a metallic chromium film is formed on a substrate by, for example, a sputtering method, and then, a chromium nitride film and a chromium oxide film are formed. Then, patterning the chromium nitride film and the chromium oxide film by photolithography and etching.

Alternatively, an optical scale may be formed by the following method. After forming a metallic chromium film on a substrate, a resist pattern is formed on the metallic chromium film, and a chromium nitride film and a chromium oxide film are formed using a known vacuum film forming method such as a sputtering method. Thereafter, by removing the resist pattern, the chromium nitride film and the chromium oxide film formed immediately on the resist pattern are lifted off, to obtain a pattern of the chromium nitride film and the chromium oxide film.

(5) Modification 1

Figure 2:
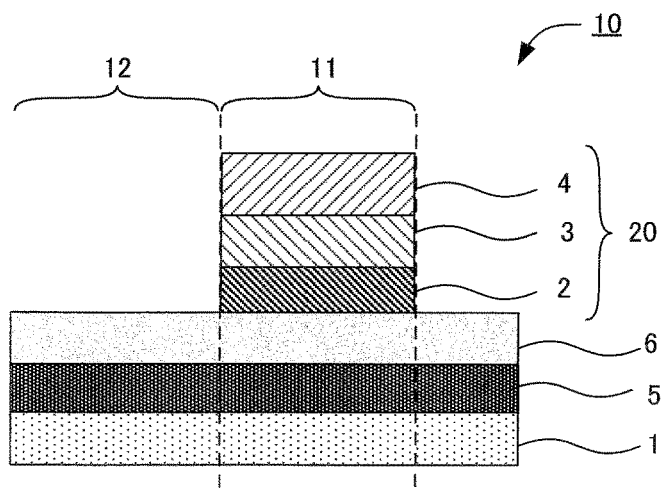
FIG. 2 is a schematic cross-sectional view illustrating an example of a reflection-type optical encoder scale (first embodiment) in the present disclosure.

FIG. 2 is a schematic cross-sectional view illustrating another example of the reflection-type optical encoder scale in the present embodiment. In optical scale 10 in the present embodiment illustrated in FIG. 2, high reflection region 12 and low reflection region 11 are alternately placed on substrate 1. On the substrate 1, high reflection metallic film 5 and a protective film 6 are formed in this order.

In the high reflection region 12, light is reflected by the high reflection metallic film 5. Meanwhile, in the low reflection region 11, low reflection portion 20 is formed. The low reflection portion 20 includes the metallic chromium film 2 formed on the protective film 5, and the chromium oxide film 4 and the chromium nitride film 3 randomly formed on the metallic chromium film 2.

(i) High Reflection Metallic Film

The high reflection metallic film preferably includes a metal having high reflectance, and examples thereof may include silver, aluminum, rhodium, chromium, and alloys including these metals as a main component. Examples of the metal film having a high reflectance particularly in the near infrared range may include gold, copper, and alloys including these metals as a main component.

(ii) Protective Film

When the high reflection metallic film has a property of being easily corroded, it is preferable to form a protective film on the high reflection metallic film. The protective film may be the same as that of the material used as a protective film for a general optical functional member, and examples thereof may include a photocurable resin or a thermosetting resin such as a photosensitive polyimide resin, an epoxy resin, and an acrylic resin; and an inorganic material. Also, examples of other materials may include a polymerization initiator and various additives. The thickness of the protective film may be appropriately selected. Also, examples of a method for forming a protective film may include a known coating method such as a spin coating method and a die coating method.

(6) Modification 2

Figure 3A:
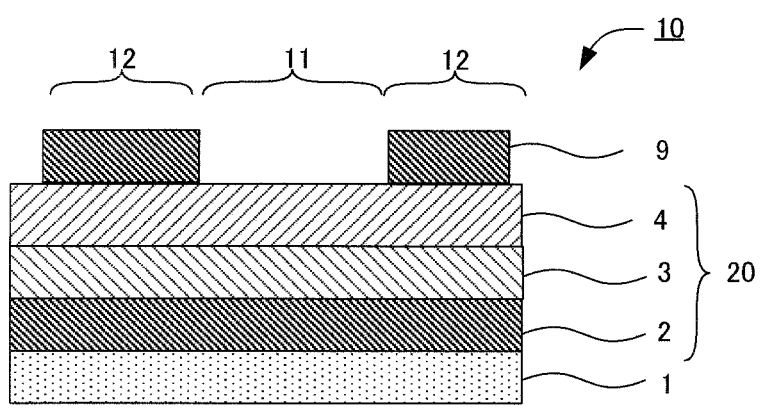
FIGS. 3A and 3B are schematic cross-sectional views illustrating an example of a reflection-type optical encoder scale (first embodiment) in the present disclosure.
Figure 3B:
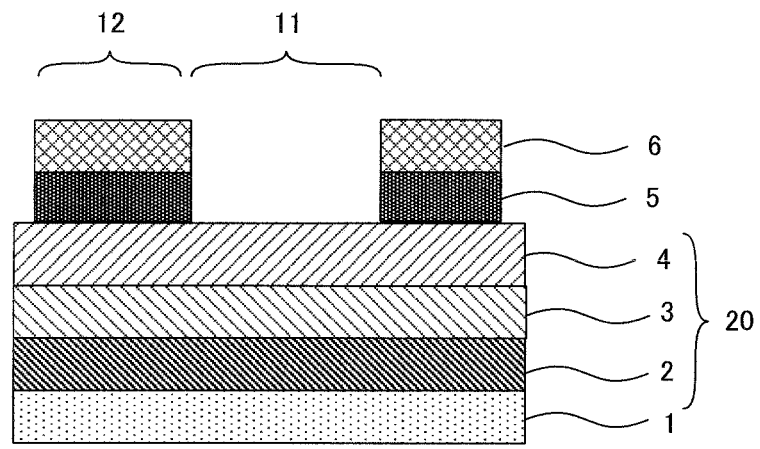

FIGS. 3A and 3B are schematic cross-sectional views illustrating another example of a reflection-type optical encoder scale in the present embodiment. Optical scale 10 in the present embodiment illustrated in FIG. 3A is an embodiment wherein a pattern formed metallic chromium film 9 is formed on a stacked body including substrate 1, metallic chromium film 2, and chromium nitride film 3 and chromium oxide film 4 randomly formed on the metallic chromium film 2.

FIG. 3B is an embodiment wherein pattern formed high reflection metallic film 5 is formed on the stacked body. The optical scale illustrated in FIGS. 3A and 3B comprises high reflection region 12 and low reflection region 11 alternately placed on substrate 1, and the high reflection region 12 includes pattern formed metallic chromium film 9 or high reflection metallic film 5, and light is reflected by the metallic chromium film 9 or the high reflection metallic film 5. The low reflection region 11 includes low reflection portion 20 including the metallic chromium film 2 formed on the substrate 1, and the chromium nitride film 3 and the chromium oxide film 4 randomly formed on the metallic chromium film 2, and light is reflected by the low reflection portion 20. As illustrated in FIG. 3B, when the high reflection metallic film 5 has a property of being easily corroded, protective film 6 may be formed on the high reflection metallic film 5. In this case, the resist used for patterning the high reflection metallic film may be left as it is, and use it as the protective film 6. Meanwhile, since the metallic chromium film is excellent in resistance to corrosion, the protective film is not necessary formed on the pattern formed metallic chromium film 9.

(7) Ratio S/N

As described above, since the reflection-type optical encoder scale in the present embodiment is capable of reducing the reflectance on the low reflection region, the ratio S/N represented by the following formula may be increased.

ratio S/N=reflectance on high reflection region/reflectance on low reflection region Incidentally, the reflectance on the high reflection region and the reflectance on the low reflection region in the above formula denote the reflectance of the same wavelength.

In the present embodiment, the ratio S/N may be 6 or more, among the above, 15 or more, preferably 100 or more, and particularly preferably 200 or more.

The basis for the value of ratio S/N will be described in the following Examples.

(8) Optical Scale

The optical scale in the present disclosure may be for a rotary encoder, and may be for a linear encoder.

B. Encoder (First Embodiment)

The present disclosure provides a reflection-type optical encoder comprising: the reflection-type optical encoder scale described above; a light source configured to irradiate light with wavelength $\lambda$ to the reflection-type optical encoder scale; and a light detector configured to detect light from the light source, reflected by the reflection-type optical encoder scale.

Figure 7A:
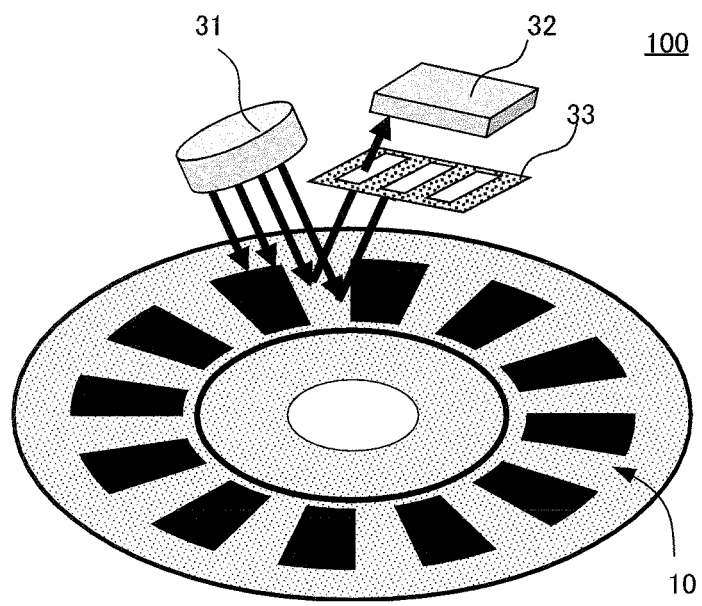
FIGS. 7A and 7B are a schematic perspective view and a schematic cross-sectional view illustrating an example of a reflection-type optical encoder in the present disclosure.
Figure 7B:
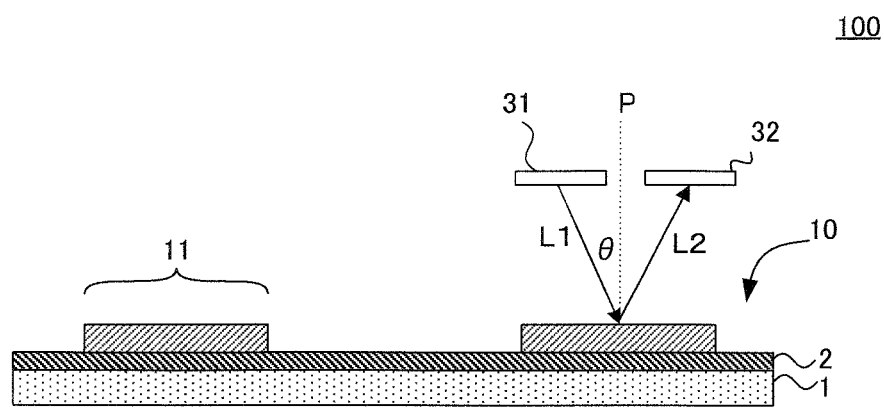

FIG. 7A is a schematic perspective view illustrating an example of the reflection-type optical encoder in the present disclosure, and FIG. 7B is a schematic cross-sectional view of the optical encoder provided with the optical scale 10 including the low reflection region 11 of FIG. 1A. Reflection-type optical encoder 100 in the present disclosure comprises the reflection-type optical encoder scale 10 described above, and further, light source 31 and light detector 32.

Further, fixed slit 33 may be included between the light detector 32 and the reflection-type optical encoder scale 10. By providing the fixed slit, the amount variation of the light received by the light detector 32 is increased so that the sensitivity of detection may be improved. The fixed slit 33 may be provided between the light source 31 and the reflection-type optical encoder scale 10.

Since the difference between the reflectance on the high reflection region and the reflectance on the low reflection region in the reflection-type optical encoder 100 in the present disclosure is large, false detection of the light detector 32 may be prevented. As the result, in the reflection-type optical encoder 100, it is easy to read the optical scale 10, and has excellent encoder property. Although FIGS. 7A and 7B illustrate a rotary encoder, it may be a linear encoder. The reflection-type optical encoder scale in the present disclosure will be described in detail.

(1) Reflection-Type Optical Encoder Scale

Since the reflection-type optical encoder scale is the same as those explained in "A. Reflection-type optical encoder scale (first embodiment)" described above, the explanation thereof is omitted here.

(2) Light Source

Examples of the light source may include a LED (light emitting diode) and a laser. The wavelength λ of light L1 irradiated from the light source is, for example, green to infrared (approximately 500 to 1000 nm) range.

The low reflection region in the optical scale in the present disclosure is capable of reducing the reflectance of light with these wavelength range, and in particular, it is effective to reduce the reflectance of light with red to infrared (approximately 600 to 1000 nm) range.

The incident angle of light L1 with respect to the optical scale 10 is, for example, 5° or more and 45° or less. As illustrated in FIG. 7B, incident angle θ is the angle formed by perpendicular line P of the surface of the substrate and the incident direction of light L1 from the light source.

(3) Light Detector

The light detector detects light L2 reflected by the optical scale. Examples of the light detector may include a light receiving element such a photodiode and an imaging element (such as photoelectric conversion element).

C. Reflection-Type Optical Encoder Scale (Second Embodiment)

The reflection-type optical encoder scale in the present embodiment comprises a high reflection region and a low reflection region alternately placed on a transparent substrate, wherein the low reflection region includes a light reflection portion including a chromium oxide film and a chromium nitride film randomly formed on the transparent substrate, and a metallic chromium film formed on the chromium oxide film or the chromium nitride film; and the high reflection region has higher reflectance of incident light from the transparent substrate side of the reflection-type optical encoder scale, than the low reflection region.

The second embodiment in the present disclosure is an embodiment wherein light enters from the transparent substrate side of the optical scale. Since such optical scale in the present embodiment includes, as the low reflection region, a light reflection portion including a three-layered structure of a chromium oxide film and a chromium nitride film randomly formed, and a metallic chromium film, from the transparent substrate side, and light is reflected by the light reflection portion, the reflectance on the low reflection region of incident light from the transparent substrate side, of any one of wavelengths in a wavelength range of 550 nm to 950 nm, may be reduced to 10% or less, and preferably 5% or less. Therefore, the difference between the reflectance on the high reflection region and the reflectance on the low reflection region may be increased.

Meanwhile, the reflectance of the low reflection region cannot be sufficiently reduced with the light reflection portion including a two-layered structure of a metallic chromium film and a chromium oxide film; a two-layered structure of a metallic chromium film and a chromium nitride film; or a combination of other metallic film and at least one of a chromium oxide film and a chromium nitride film.

Also, the chromium oxide film and the chromium nitride film may be easily formed by utilizing a reactive sputtering method, for example, by only preparing the metallic chromium. Further, compared to a silicon oxide film, a high precision patterning may be easily carried out.

Further, since the reflection surface is covered with a glass, it is unlikely damaged from the outside world. Also, there is an advantage that the cleaning of the reflection surface is easy.

In the present specification, "a chromium oxide film and a chromium nitride film randomly formed on the transparent substrate, and a metallic chromium film formed on the chromium oxide film or the chromium nitride film" means that they may be formed in the order of the chromium oxide film, the chromium nitride film, and the metallic chromium film from the transparent substrate side; and may be formed in the order of the chromium nitride film, the chromium oxide film, and the metallic chromium film.

Figure 4A:
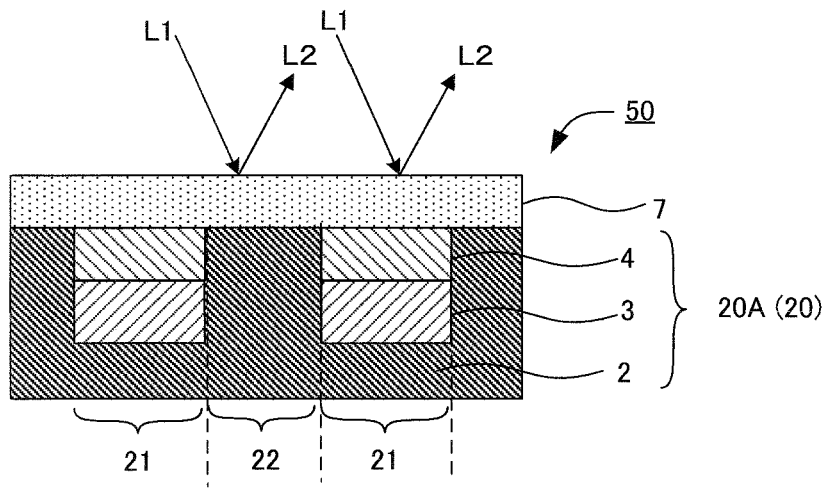
FIGS. 4A to 4C are schematic cross-sectional views illustrating an example of a reflection-type optical encoder scale (second embodiment) in the present disclosure.
Figure 4B:
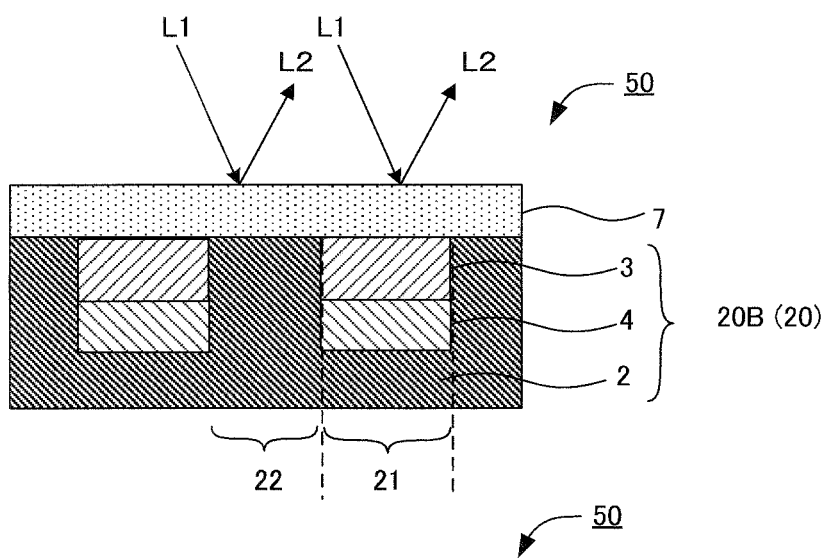
Figure 4C:
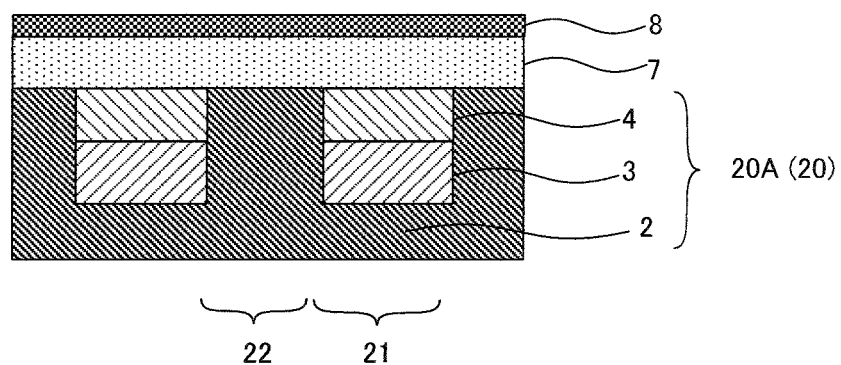

FIGS. 4A and 4B are schematic cross-sectional views illustrating an example of a reflection-type optical encoder scale in the present embodiment. Optical scale 50 in the present embodiment illustrated in FIGS. 4A and 4B comprises high reflection region 22 and low reflection region 21 alternately placed on transparent substrate 7. The high reflection region 22 includes metallic chromium film 2 formed on the transparent substrate, and light is reflected by the metallic chromium film 2. In FIG. 4A, the low reflection region 21 includes light reflection portion 20A in the first aspect including the chromium oxide film 4 formed on the transparent substrate 7, the chromium nitride film 3 placed on the chromium oxide film 4, and metallic chromium film 2 placed on the chromium nitride film 3. Meanwhile, in FIG. 4B, the low reflection region 21 includes light reflection portion 20B in the second aspect including the chromium nitride film 3 formed on the transparent substrate 7, the chromium oxide film 4 placed on the chromium nitride film 3, and metallic chromium film 2 placed on the chromium oxide film 4. In FIG. 4C, antireflection film 8 is placed on the transparent substrate 7, on opposite side to the light reflection portion.

(1) Low Reflection Region

The low reflection region need only a light reflection portion. The light reflection portion includes a chromium oxide film and a chromium nitride film randomly formed on the transparent substrate, and a metallic chromium film formed on the chromium oxide film or the chromium nitride film. Specifically, the chromium oxide film, the chromium nitride film, and the metallic chromium film are placed in this order from the transparent substrate side (light reflection portion in the first aspect); or the chromium nitride film, the chromium oxide film, and the metallic chromium film are placed in this order (light reflection portion in the second aspect), and it is placed in the optical scale so as the metallic chromium film is on the opposite side to the transparent substrate.

In the present embodiment, the light reflection portion in the first aspect is preferable since the reflectance on the low reflection region may further be decreased.

(i) Light Reflection Portion in First Aspect

The light reflection portion in the present aspect includes the chromium oxide film, the chromium nitride film, and the metallic chromium film placed in this order from the transparent substrate side. Since a composition or a method for forming the chromium oxide film, the chromium nitride film, and the metallic chromium film are the same as those explained in "A. Reflection-type optical encoder scale (first embodiment), (1) Low reflection region, (i) Low reflection portion in first aspect" described above, the explanation thereof is omitted here.

(a) Chromium Oxide Film

The chromium oxide film in the present aspect is formed on the transparent substrate. The thickness of the chromium oxide film in the present aspect is not particularly limited, and is, for example, preferably in a range of 5 nm to 100 nm, and particularly preferably in a range of 10 nm to 80 nm. When the thickness is in the above range, compared to a case out of the above range, the reflectance on the low reflection region may be reduced. Further, it is easy to reduce the reflectance in the entire range of green to infrared (approximately 500 to 1000 nm) range.

(b) Chromium Nitride Film

The chromium nitride film in the present aspect is placed between the chromium oxide film and the metallic chromium film. The thickness $T_N$ of the chromium nitride film is not particularly limited; and is preferably in a range of 10 nm to 100 nm, particularly preferably in a range of 15 nm to 80 nm.

Further, in relation to the thickness $T_O$ of the chromium oxide film, when the wavelength is 850 nm, the total of $T_N$ and $T_O$ is preferably 30 nm or more, and when the wavelength is 550 nm, the total of $T_N$ and $T_O$ is preferably 20 nm or more. Further, since it is easy to reduce the reflectance in the entire range of green to infrared (approximately 500 to 1000 nm) range, the range is preferably in a range of 20 nm to 80 nm.

(c) Metallic Chromium Film

The metallic chromium film in the present aspect is formed on the chromium nitride film, on opposite side to the chromium oxide. A protective film may or may not be placed on the metallic chromium film, on opposite side to the chromium nitride film. The thickness of the metallic chromium film is not particularly limited; and since it may be the same as those explained in "A. Reflection-type optical encoder scale (first embodiment), (1) Low reflection region, (i) Low reflection portion in first aspect" described above, the explanation thereof is omitted here.

(ii) Light Reflection Portion in Second Aspect

In the light reflection portion in the present aspect, the chromium nitride film, the chromium oxide film, and the metallic chromium film are placed in this order from the transparent substrate side. Since a composition or a method for forming the chromium nitride film, the chromium oxide film, and the metallic chromium film are the same as those explained in "A. Reflection-type optical encoder scale (first embodiment), (1) Low reflection region, (i) Low reflection portion in first aspect" described above, the explanation thereof is omitted here.

(a) Chromium Nitride Film

The chromium nitride film in the present aspect is placed between the chromium oxide film and the transparent substrate. The thickness of the chromium nitride film is not particularly limited; and is preferably in a range of 5 nm to 80 nm, particularly preferably in a range of 10 nm to 60 nm. Further, in relation to the thickness $T_O$ of the chromium oxide film, when the wavelength is 850 nm, the total of $T_N$ and $T_O$ is 30 nm or more, and when the wavelength is 550 nm, the total of $T_N$ and $T_O$ is preferably 15 nm or more. Further, the range is preferably in a range of 5 nm to 40 nm, since it is easy to reduce the reflectance in the entire range of green to infrared (approximately 500 to 1000 nm) range.

(b) Chromium Oxide Film

The chromium oxide film in the present aspect is formed on the transparent substrate. The thickness of the oxide film is not particularly limited; and is preferably in a range of 5 nm to 80 nm, and particularly preferably in a range of 10 nm to 60 nm. Further, the thickness of the chromium oxide film is preferably in a range of 10 nm to 45 nm since it is easy to reduce the reflectance in the entire range of green to infrared (approximately 500 to 1000 nm) range.

(c) Metallic Chromium Film

The metallic chromium film in the present aspect is formed on the chromium oxide film, on opposite side to the substrate. A protective film may or may not be placed on the metallic chromium film, on opposite side to the chromium oxide film. The thickness of the metallic chromium film is not particularly limited; and since it may be the same as those explained in "A. Reflection-type optical encoder scale (first embodiment), (1) Low reflection region, (i) Low reflection portion in first aspect" described above, the explanation thereof is omitted here.

(2) High Reflection Region

The configuration of the high reflection region in the present embodiment is not particularly limited as long as the reflectance of incident light from the transparent substrate of the reflection-type optical encoder scale is higher than the low reflection region. The reflectance on the high reflection region, of any one of wavelengths in a wavelength range of 550 nm to 950 nm, is preferably 60% or more, more preferably 80% or more, and particularly 90% or more. For example, the high reflection region in FIGS. 4A and 4B includes the metallic chromium film placed on the transparent substrate, and reflects light by the transparent substrate and the metallic chromium film.

(3) Transparent Substrate

The total light transmittance, with respect to the light with wavelength range of 550 nm to 950 nm, of the transparent substrate is preferably 80% or more, more preferably 85% or more, and particularly 90% or more. The thickness of the transparent substrate may be any thickness capable of exhibiting a desired light transmissivity, and is preferably in a range of, for example, 0.1 mm to 2.0 mm.

Specifically, glass, and a transparent resin substrate, for example, may be used. Among them, glass is preferable. This is because glass is high in strength, linear expansion coefficient is small so that the dimensional variation due to temperature variation in the use environment may be suppressed. Examples of the transparent resin substrate may include one including the transparent resin material selected from, for example, polypropylene (PP), polyethylene terephthalate (PET), polyethylene naphthalate (PEN), polyethylene (PE), polycarbonate (PC), acrylic, polyvinyl chloride, polyvinyl alcohol, polyimide, polyetherimide, polyether ether ketone, epoxy resin, silicone resin, and phenol resin.

(4) Antireflection Film

In the present embodiment, as illustrated in FIG. 4C, antireflection film 8 may be provided on the transparent substrate 7. By providing the antireflection film, the reflectance on the low reflection region may further be reduced so that it is possible to increase the contrast of the image by the reflected light from the optical scale.

The antireflection film may be an organic layer, and may be inorganic layer, as long as it may exhibit a predetermined antireflection function. Examples thereof may include a low refractive index thin film such as $SiO_2$, $MgF_2$, $Al_2O_3$, and $TiO_3$. Also, the antireflection film may be a multilayer film wherein a thin film including a high refractive index material (hereinafter, referred to as a high refractive index film), and a thin film including a low refractive index material having a refractive index lower than that of the high refractive index material (hereinafter, referred to as a low refractive index film) are alternately stacked. In this regard, however, the low refractive index film is formed on the most observer side of the multilayer film. Incidentally, the number of the thin films and the refractive index of each thin film in the multilayer film are not particularly limited.

(5) Method for Producing

A method for producing an optical scale in the present embodiment is not particularly limited, and may be produced by a selective etching or a lift-off. Specifically, a chromium nitride film and a chromium oxide film are formed on a transparent substrate by, for example, a sputtering method, patterned by photolithography and etching, and then, a metallic chromium film is formed on the patterned chromium nitride film and chromium oxide film to produce an optical scale illustrated in FIG. 4. Also, the patterning may be carried out by a lift-off.

(6) Modification 1

Figure 5A:
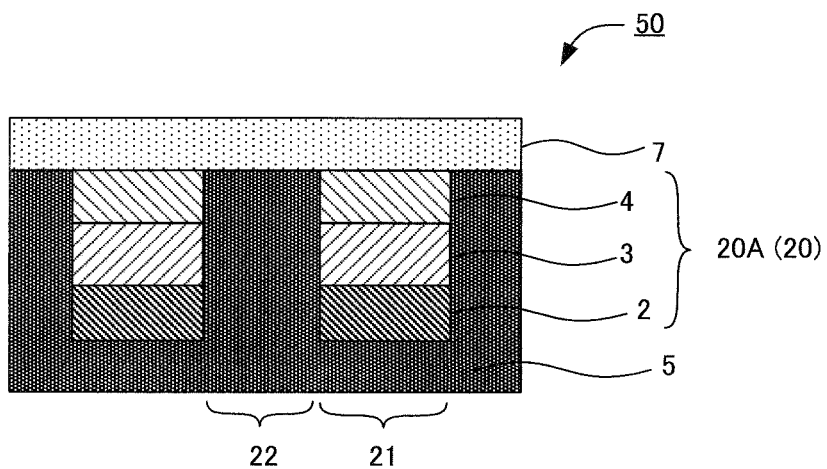
FIGS. 5A and 5B are schematic cross-sectional views illustrating an example of a reflection-type optical encoder scale (second embodiment) in the present disclosure.
Figure 5B:
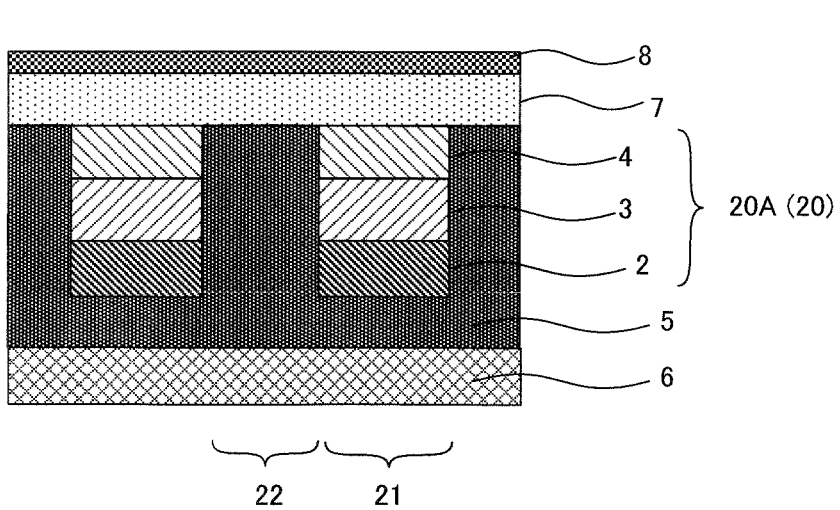

FIGS. 5A and 5B are schematic cross-sectional views illustrating an example of the reflection-type optical encoder scale in the present embodiment. The low reflection region 21 of optical scale 50 in the present embodiment illustrated in FIGS. 5A and 5B, includes light reflection portion 20 including the chromium oxide film 4 and the chromium nitride film 3 randomly formed on the transparent substrate 7, and the metallic chromium film 2 formed on the chromium oxide film or the chromium nitride film. The high reflection region 22 includes the high reflection metallic film 5 formed on the transparent substrate, and reflects light by the transparent substrate 7 and the high reflection metallic film 5. As illustrated in FIG. 5B, when the high reflection metallic film 5 has a property of being easily corroded, it is preferable to form protective film 6 on the high reflection metallic film 5. Also, the antireflection film 8 may be provided on the transparent substrate 7, on opposite side to the light reflection portion 20.

(7) Modification 2

Figure 6A:
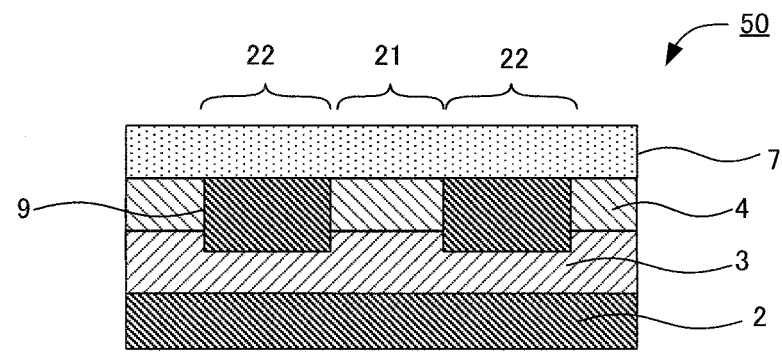
FIGS. 6A to 6C are schematic cross-sectional views illustrating an example of a reflection-type optical encoder scale (second embodiment) in the present disclosure.
Figure 6B:
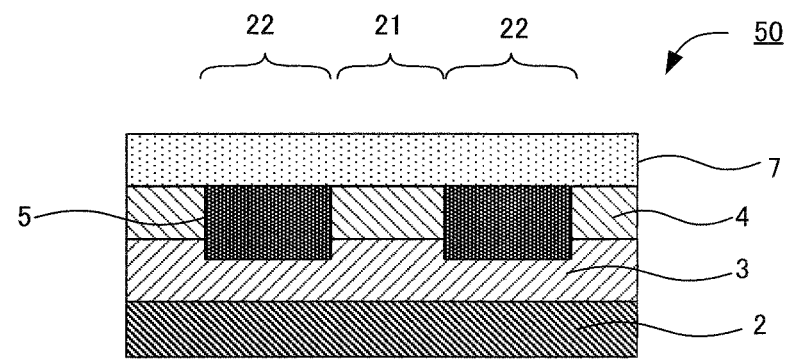
Figure 6C:
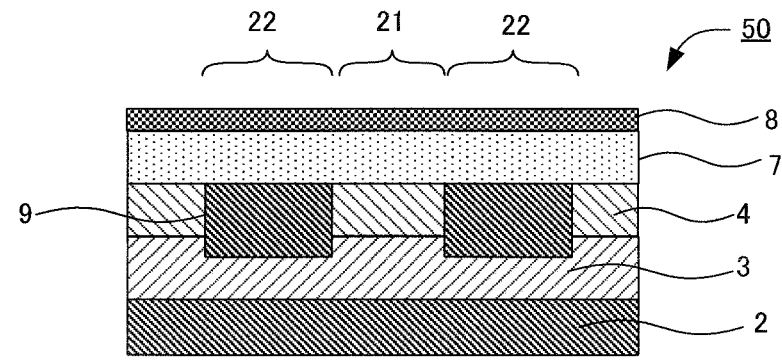

FIGS. 6A to 6C are schematic cross-sectional views illustrating another example of the reflection-type optical encoder scale in the present embodiment. The low reflection region 21 of optical scale 50 in the present embodiment illustrated in FIG. 6A includes light reflection portion including the chromium oxide film 4 and the chromium nitride film 3 randomly formed on the transparent substrate 7, and the metallic chromium film 2 formed on the chromium oxide film or the chromium nitride film. The high reflection region 22 includes pattern formed metallic chromium film 9 on the transparent substrate. Also, FIG. 6B is a case wherein the high reflection region 22 includes pattern formed high reflection metallic film 5 on the transparent substrate. Also, the antireflection film 8 may be provided (FIG. 6C) on the transparent substrate 7 of FIGS. 6A and 6B, on opposite side to the light reflection portion 20. By providing the antireflection film, it is possible to further increase the contrast of the image by the reflected light from the optical scale. Further, the protective film may be provided on the metallic chromium film 2, on opposite side to the chromium nitride film 3 and the chromium oxide film 4.

(8) Ratio S/N

As described above, since the reflection-type optical encoder scale in the present embodiment is capable of reducing the reflectance on the low reflection region, the ratio S/N represented by the following formula may be increased.

ratio S/N=reflectance on high reflection region/reflectance on low reflection region Incidentally, the reflectance on the high reflection region and the reflectance on the low reflection region in the above formula denote the reflectance of the same wavelength.

In the present embodiment, the ratio S/N may be 6 or more, among the above, 15 or more, preferably 100 or more, and particularly preferably 200 or more.

The basis for the value of ratio S/N will be described in the following Examples.

D. Optical Encoder (Second Embodiment)

The present disclosure provides a reflection-type optical encoder comprising: the reflection-type optical encoder scale described above; a light source configured to irradiate light with wavelength λ to the reflection-type optical encoder scale; and a light detector configured to detect light from the reflection-type optical encoder scale of the light source.

(1) Reflection-Type Optical Encoder Scale

Since the reflection-type optical encoder scale is the same as those explained in "C. Reflection-type optical encoder scale (second embodiment)" described above, the explanation thereof is omitted here.

(2) Light Source and Light Detector

Since the light source and the light detector are the same as those explained in "B. Reflection-type optical encoder scale (first embodiment)" described above, the explanation thereof is omitted here.

E. Reflection-Type Optical Encoder Scale (Third Embodiment)

The reflection-type optical encoder scale in the present embodiment comprises a high reflection region and a low reflection region alternately placed on a transparent substrate, wherein the low reflection region includes a low reflection portion including at least three stacked inorganic layers, and a reflectance on the low reflection region is 5% or less; the high reflection region includes at least one stacked inorganic layer, and a reflectance on the high reflection region is 60% or more; and a value represented by the following formula is 6 or more.

ratio S/N=reflectance on high reflection region/reflectance on low reflection region Incidentally, the reflectance on the high reflection region and the reflectance on the low reflection region in the above formula denote the reflectance of the same wavelength.

The low reflection portion constituting the low reflection region in the present embodiment includes at least three stacked inorganic layers. Such inorganic layer may be a metal layer, and may be a metal compound such as metal oxide and metal nitride.

Examples of the material constituting such inorganic layer may include metallic chromium, chromium oxide, chromium nitride, silicium oxide, aluminum oxide, titanium oxide, and magnesium fluoride.

Of any one of wavelengths in a wavelength range of 550 nm to 950 nm, the reflectance on the low reflection region is 5% or less, and particularly preferably 1% or less.

Also, the configuration of the high reflection region is not particularly limited, and the high reflection region needs only the reflectance of any one of wavelengths in a wavelength range of 550 nm to 950 nm of 60% or more. Examples thereof may include those explained in "A. Reflection-type optical encoder scale (first embodiment)" and "C. Reflection-type optical encoder scale (second embodiment)" described above.

The reflectance on the high reflection region, of any one of wavelengths in a wavelength range of 550 nm to 950 nm, is 60% or more, particularly 80% or more, and among the above, preferably 90% or more.

In the present embodiment, the ratio S/N may be 6 or more, among the above, 15 or more, preferably 100 or more, and particularly preferably 200 or more.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

The present disclosure is hereinafter explained in further details with reference to Examples and Comparative Examples.

Example 1

Figures 8A, 8B:
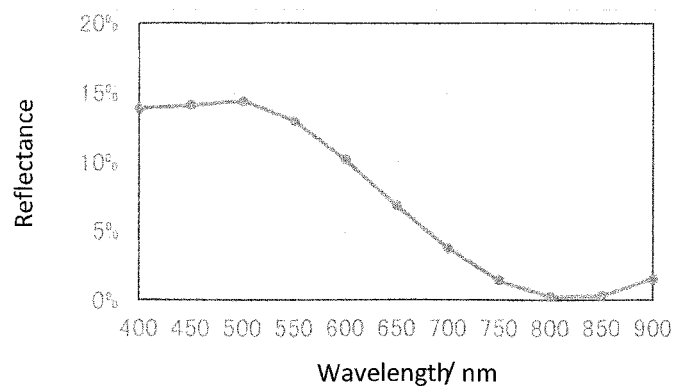
FIGS. 8A and 8B are a table and a graph showing a simulation result in Example 1.

In the first embodiment, for the low reflection portion in the first aspect (FIG. 1A), the thickness of the chromium oxide film 4 and chromium nitride film 3 of the low reflection portion 20 were varied (the thickness setting of the metallic chromium film 2: 100 nm), and the reflectance when the light L1 having a wavelength of 850 nm incident on the low reflection region 11 from the opposite side to glass (substrate 1), was calculated by simulations. The results are shown in FIG. 8A. In FIG. 8A, the triangle indicates reflectance of 20% or less, the single circle indicates reflectance of 10% or less, and the double circle indicates reflectance of 5% or less. The wavelength dependency of the reflectance, when the thickness of the chromium oxide film was 50 nm, the thickness of the chromium nitride film was 30 nm, and the thickness of the metallic chromium film was 100 nm, is shown in FIG. 8B.

In Example 1, reflectance (at wavelength of 850 nm) on the high reflection region wherein the metallic chromium film 2 was placed was 64.1%. Also, the reflectance (at wavelength of 850 nm) on the low reflection region, wherein the thickness of each film was adjusted to the above values, was 0.3%.

The S/N ratio in this case was 214.

Meanwhile, the reflectance (at wavelength of 850 nm) on the high reflection region wherein a silver was placed instead of the metallic chromium film 2 as the high reflection metallic film, was 91.1%.

The S/N ratio in this case was 304.

Example 2

Figures 9A, 9B:
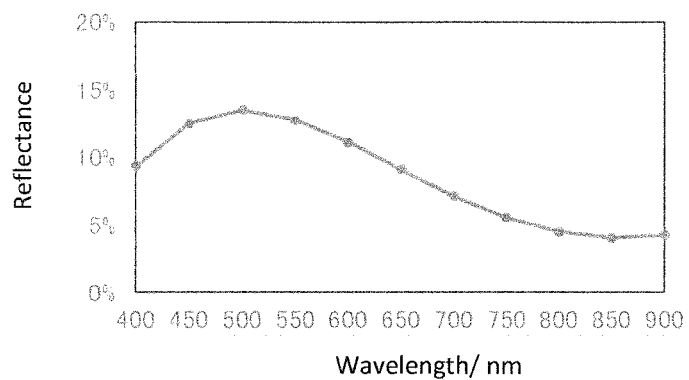
FIGS. 9A and 9B are a table and a graph showing a simulation result in Example 2.

In the second embodiment, for the low reflection portion in the first aspect (FIG. 4A), the thickness of the chromium oxide film and chromium nitride film of the low reflection portion 20 were varied (the thickness setting of the metallic chromium film: 100 nm), and the reflectance when the light having a wavelength of 850 nm incident on the low reflection region from the transparent substrate (glass), was calculated by simulations. The results are shown in FIG. 9A. Also, the wavelength dependency of the reflectance, when the thickness of the chromium oxide film was 25 nm, the thickness of the chromium nitride film was 45 nm, and the thickness of the metallic chromium film was 100 nm, is shown in FIG. 9B. Incidentally, the thickness of the metallic chromium film here indicates the thickness in the low reflection region 21, which indicates the thickness of the metallic chromium film 2 placed on the chromium nitride film 3 in the low reflection region 21, on the surface opposite to the chromium oxide film 4.

In Example 2, reflectance (at wavelength of 850 nm) on the high reflection region wherein the metallic chromium film 2 was placed was 70.0%. Also, the reflectance (at wavelength of 850 nm) on the low reflection region, wherein the thickness of each film was adjusted to the above values, was 4.1%.

The S/N ratio in this case was 17.

Meanwhile, the reflectance (at wavelength of 850 nm) on the high reflection region wherein a silver was placed instead of the metallic chromium film 2 as the high reflection metallic film, was 97.0%.

The S/N ratio in this case was 24.

Example 3

Figures 10A, 10B:
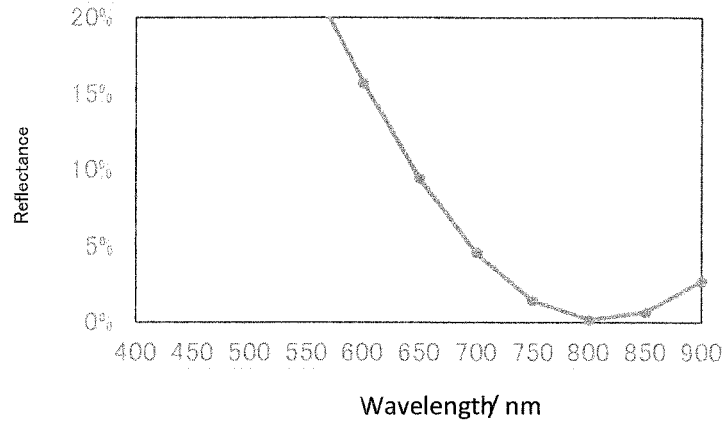
FIGS. 10A and 10B are a table and a graph showing a simulation result in Example 3.

In the first embodiment, for the low reflection portion in the second aspect (FIG. 1B), the thickness of the chromium oxide film and chromium nitride film of the low reflection portion were varied (the thickness setting of the metallic chromium film: 100 nm), and the reflectance when the light having a wavelength of 850 nm incident on the low reflection region from the opposite side to glass, was calculated by simulations. The results are shown in FIG. 10A. The wavelength dependency of the reflectance, when the thickness of the chromium oxide film was 20 nm, the thickness of the chromium nitride film was 40 nm, and the thickness of the metallic chromium film was 100 nm, is shown in FIG. 10B.

In Example 3, reflectance (at wavelength of 850 nm) on the high reflection region wherein the metallic chromium film 2 was placed was 64.1%. Also, the reflectance (at wavelength of 850 nm) on the low reflection region, wherein the thickness of each film was adjusted to the above values, was 0.6%.

The S/N ratio in this case was 107.

Meanwhile, the reflectance (at wavelength of 850 nm) on the high reflection region wherein a silver was placed instead of the metallic chromium film 2 as the high reflection metallic film, was 91.1%.

The S/N ratio in this case was 152.

Example 4

Figures 11A, 11B:
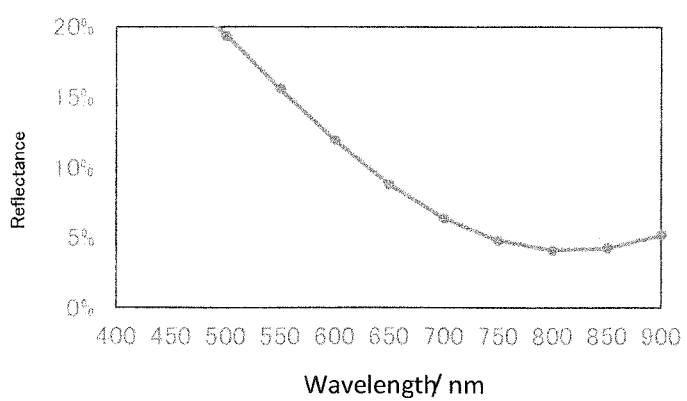
FIGS. 11A and 11B are a table and a graph showing a simulation result in Example 4.

In the second embodiment, for the low reflection portion in the second aspect (FIG. 4B), the thickness of the chromium oxide film and chromium nitride film of the low reflection portion were varied (the thickness setting of the metallic chromium film: 100 nm), and the reflectance when the light having a wavelength of 850 nm incident on the low reflection region from the glass side, was calculated by simulations. The results are shown in FIG. 11A. Also, the wavelength dependency of the reflectance, when the thickness of the chromium oxide film was 40 nm, the thickness of the chromium nitride film was 20 nm, and the thickness of the metallic chromium film was 100 nm, is shown in FIG. 11B. Incidentally, the thickness of the metallic chromium film here indicates the thickness in the low reflection region 21, which indicates the thickness of the metallic chromium film 2 placed on the chromium oxide film 4 in the low reflection region 21, on the surface opposite to the chromium nitride film 3.

In Example 4, reflectance (at wavelength of 850 nm) on the high reflection region wherein the metallic chromium film 2 was placed was 70.0%. Also, the reflectance (at wavelength of 850 nm) on the low reflection region, wherein the thickness of each film was adjusted to the above values, was 4.1%.

The S/N ratio in this case was 17.

Meanwhile, the reflectance (at wavelength of 850 nm) on the high reflection region wherein a silver was placed instead of the metallic chromium film 2 as the high reflection metallic film, was 97.0%.

The S/N ratio in this case was 24.

Comparative Example 1

Figure 12A:
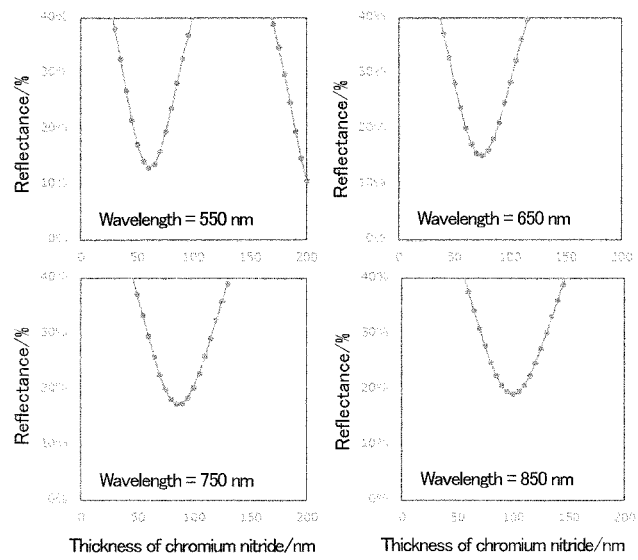
FIGS. 12A and 12B are a graph showing a simulation result and a schematic cross-sectional view of the low reflection region in Comparative Example 1.
Figure 12B:
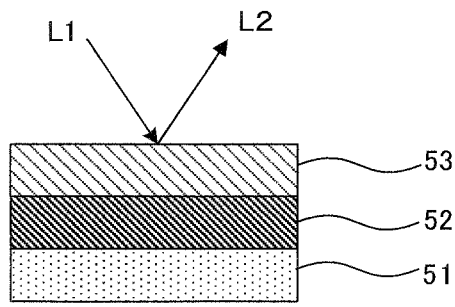

A thin-film multilayer film including the metallic chromium film 52 and the chromium nitride film 53 in this order on glass 51 as illustrated in FIG. 12B, was formed and used as the low reflection region. The reflectance (vertical axis) when the light incident on the low reflection region from the opposite side to glass, was calculated by simulations depending on the thickness of the chromium nitride film (horizontal axis). The wavelengths were 550 nm, 650 nm, 750 nm, and 850 nm. The results when the thickness of the metallic chromium film was 100 nm are shown in FIG. 12A.

Comparative Example 2

Figure 13A:
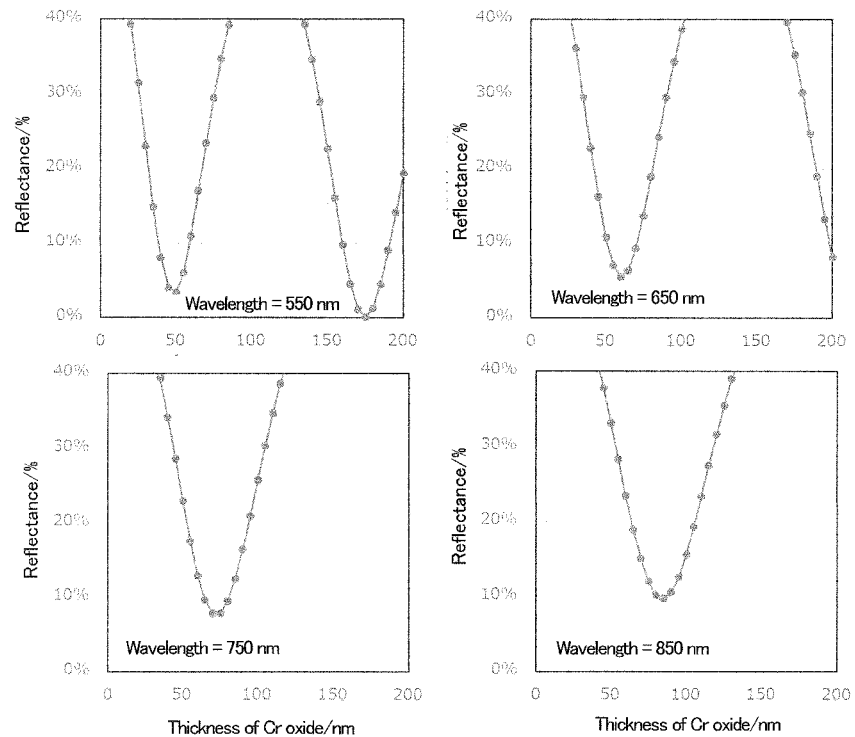
FIGS. 13A and 13B are a graph showing a simulation result and a schematic cross-sectional view of the low reflection region in Comparative Example 2.
Figure 13B:
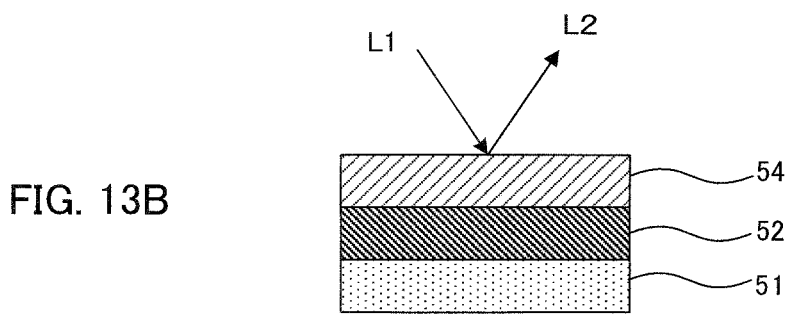

A thin-film multilayer film including the metallic chromium film 52 and the chromium oxide film 54 in this order on glass 51 as illustrated in FIG. 13B, was formed and used as the low reflection region. The reflectance (vertical axis) when the light incident on the low reflection region from the opposite side to glass, was simulated depending on the thickness of the chromium oxide film (horizontal axis). The results when the thickness of the metallic chromium film was 100 nm are shown in FIG. 13A.

Comparative Example 3

Figure 14A:
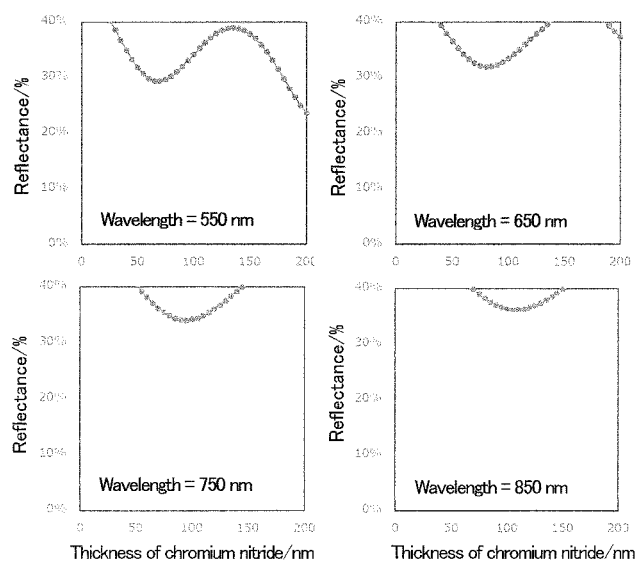
FIGS. 14A and 14B are a graph showing a simulation result and a schematic cross-sectional view of the low reflection region in Comparative Example 3.
Figure 14B:
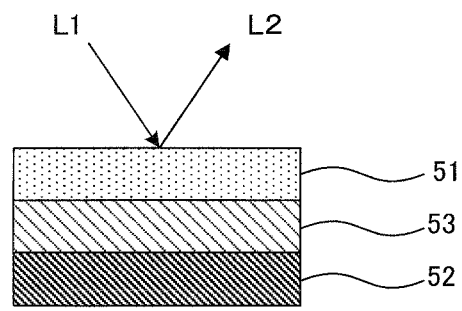

A thin-film multilayer film including the chromium nitride film 53 and the metallic chromium film 52 in this order on glass 51 as illustrated in FIG. 14B, was formed and used as the low reflection region. The reflectance (vertical axis) when the light incident on the low reflection region from the glass side, was simulated depending on the thickness of the chromium nitride film (horizontal axis). The results when the thickness of the metallic chromium film was 100 nm are shown in FIG. 14A.

Comparative Example 4

Figure 15A:
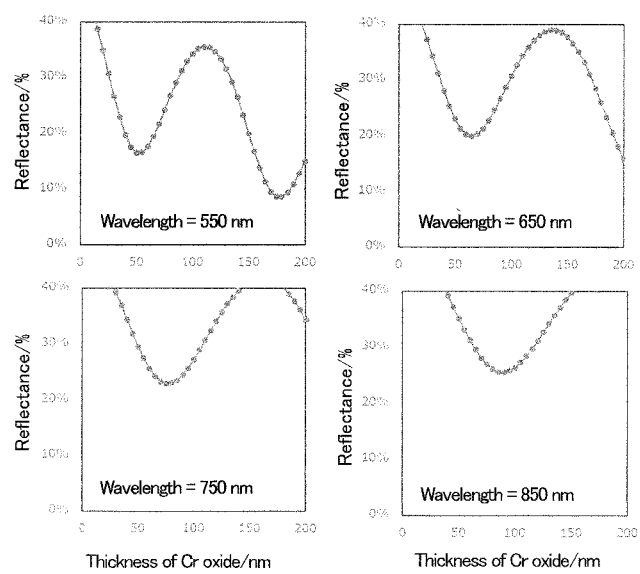
FIGS. 15A and 15B are a graph showing a simulation result and a schematic cross-sectional view of the low reflection region in Comparative Example 4.
Figure 15B:
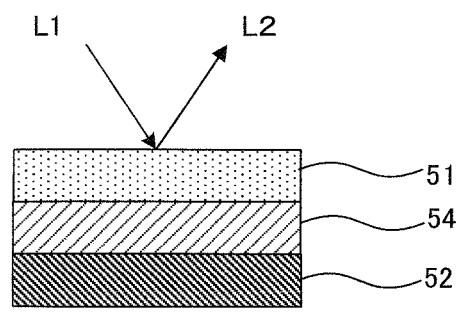

A thin-film multilayer film including the chromium oxide film 54 and the metallic chromium film 52 in this order on glass 51 as illustrated in FIG. 15B, was formed and used as the low reflection region. The reflectance (vertical axis) when the light incident on the low reflection region from the glass side, was simulated depending on the thickness of the chromium oxide film (horizontal axis). The results when the thickness of the metallic chromium film was 100 nm are shown in FIG. 15A.

From the results in Examples 1 to 4, it was possible to reduce the reflectance on the low reflection region to 10% or less, particularly 5% or less. Meanwhile, from the results in Comparative Examples 1 to 4, it was not possible to sufficiently reduce the reflectance, compared to Examples. Also, the wavelength dependency of the reflectance variation was suggested to be low in Examples 1 and 3.

REFERENCE SIGNS LIST

1: substrate
2: metallic chromium film
3: chromium nitride film
4: chromium oxide film
20: low reflection portion
11: low reflection region (first embodiment)
12: high reflection region (first embodiment)

The invention claimed is:

1. A reflection-type optical encoder scale comprising:
a high reflection region and a low reflection region, alternately placed on a substrate,
wherein the low reflection region includes a low reflection portion including a metallic chromium film placed on one surface of the substrate, and a chromium oxide film and a chromium nitride film placed on a surface of the metallic chromium film, on a side opposite to the substrate,
wherein the high reflection region has higher reflectance of incident light from the side opposite to the substrate of the reflection-type optical encoder scale than the low reflection region,
wherein the low reflection region includes the metallic chromium film,
wherein the chromium nitride film is placed on a surface of the metallic chromium film on the side opposite to the substrate, and
wherein the chromium oxide film is placed on a surface of the chromium nitride film on a side opposite to the metallic chromium film.

2. The reflection-type optical encoder scale according to claim 1, wherein an outermost surface of the low reflection region is the chromium oxide film or the chromium nitride film.

3. The reflection-type optical encoder scale according to claim 1, wherein the high reflection region includes the metallic chromium film formed on the substrate.

4. The reflection-type optical encoder scale according to claim 1, wherein the high reflection region includes a metallic silver film or a silver alloy film containing silver as a main component, formed on the substrate.

5. The reflection-type optical encoder scale according to claim 1, wherein the reflectance on the high reflection region, of any one of wavelengths in a wavelength range of 550 nm to 950 nm, is 60% or more, and
wherein a value of a ratio S/N represented by the following formula (1) is 100 or more, the ratio S/N=the reflectance on the high reflection region/the reflectance on the low reflection region. (1)

6. A reflection-type optical encoder comprising:
the reflection-type optical encoder scale according to claim 1;
a light source configured to irradiate light to a surface of the reflection-type optical encoder scale, on a side wherein the low reflection portion is placed; and
a light detector configured to detect light from the light source, reflected by the reflection-type optical encoder scale.

7. A reflection-type optical encoder scale comprising:
a high reflection region and a low reflection region, alternately placed on a substrate,
wherein the low reflection region includes a low reflection portion including a metallic chromium film placed on one surface of the substrate, and a chromium oxide film and a chromium nitride film placed in any order on a surface of the metallic chromium film, on a side opposite to the substrate,
wherein the high reflection region has a higher reflectance of incident light from the side opposite to the substrate of the reflection-type optical encoder scale than the low reflection region,
wherein the reflectance on the high reflection region, of any one of wavelengths in a wavelength range of 550 nm to 950 nm, is 60% or more, and
wherein a value of a ratio S/N represented by the following formula (4) is 100 or more, the ratio S/N=the reflectance on the high reflection region/the reflectance on the low reflection region. (4)

8. A reflection-type optical encoder comprising:
the reflection-type optical encoder scale according to claim 7;
a light source configured to irradiate light to a surface of the reflection-type optical encoder scale, on a side wherein the low reflection portion is placed; and
a light detector configured to detect light from the light source, reflected by the reflection-type optical encoder scale.

* * * * *